United States Patent [19]
Lindner et al.

[11] 3,863,880
[45] Feb. 4, 1975

[54] MOUNTING BASE
[75] Inventors: Henry Lindner, Wood Dale; James D. Kennedy, Streamwood, both of Ill.
[73] Assignee: Beatrice Foods Co., Elgin Molded Plastics Div., Elgin, Ill.
[22] Filed: Apr. 16, 1973
[21] Appl. No.: 351,310

[52] U.S. Cl............... 248/349, 40/125 N, 116/63 P
[51] Int. Cl............................................. E01f 9/10
[58] Field of Search................... 248/349, 425, 346; 211/131, 144; 40/125 N; 116/63 D, 63 R

[56] References Cited
UNITED STATES PATENTS

| | | | |
|---|---|---|---|
| 435,723 | 9/1890 | Barnes | 248/349 X |
| 2,360,757 | 10/1944 | Buttles | 248/186 |
| 2,655,331 | 10/1953 | Merritt | 248/46 |
| 3,004,745 | 10/1961 | Wilson | 248/349 |
| 3,420,480 | 1/1969 | Matson | 248/14 |
| 3,589,328 | 6/1971 | Kiniry | 40/125 N |
| 3,625,177 | 12/1971 | Miller | 40/125 N X |
| 3,792,678 | 2/1974 | Rowland | 116/63 P |
| 3,792,679 | 2/1974 | Duckett | 116/63 P |

*Primary Examiner*—J. Franklin Foss
*Attorney, Agent, or Firm*—Hill, Gross, Simpson, Van Santen, Steadman, Chiara & Simpson

[57] ABSTRACT

A mounting base for a display device or the like. The base utilizes an elongated flattened pedestal and a swivel engaged therewith formed of a single piece of material (plastic or the like). The swivel utilizes a base, a pin downwardly extending from the base, an upstanding ridge member which is reinforced by at least three vertical upstanding rib pairs, and a cap plate means. The swivel is constructed so as to be free from heat distortion when formed of molded plastic or the like.

11 Claims, 7 Drawing Figures

PATENTED FEB 4 1975

3,863,880

MOUNTING BASE

BACKGROUND OF THE INVENTION

An ever increasing need has developed for portability in display devices, warning devices, or the like. It is necessary in many use situations to be able to rapidly and simply erect a sign, notice or the like for a short period of time and then to collapse same for storage, moving or the like. Frequently, such a device must be erected in a location where the ground or supporting surface cannot be penetrated as with a stake or the like. Furthermore, after erection and also sometimes even in storage, such a device must be stable and able to withstand rugged use and environmental conditions.

While the sign making art has long since learned that an elongated pedestal of some type may be used as a surface engaging, supporting member, it has experienced considerable difficulty in producing a simple, reliable, rugged swivel means which interconnects such a pedestal with an over-mounted sign display device, warning device, or the like. When, for example, the swivel means is formed of plastic, it is generally thought necessary to employ a relatively solid mass of material for reasons of strength and durability, but such a mass of plastic material is subject to severe thermal distortion as when cooling from a molten or semifluid condition, such as occurs during the melting or extrusion portion of a thermoplastic, to a final ambient temperature condition. The thermal distortion is caused by the inherent shrinkage, warpage, heat-sink marks, and the like characteristically produced as a formed, massive plastic body contracts as it cools froma heated condition. Even a relatively small mass of plastic can experience severe distortion during cooling. Such heat distortion can make a swivel for a pedestal loose fitting as respects the pedestal and prone to produce a product device which has poor stability, strength, and environmental/climate exposure characteristics, all as those skilled in the art appreciate.

An added problem with plastic swivel means arises from the fact that it has been very difficult to produce a swivel type of rigid characteristics which will support a device in a desired configuration against all commonly occurring climates and environmental use conditions even when such swivel is relatively free from heat distortion problems.

SUMMARY OF THE INVENTION

The present invention is concerned with a mounting base having an elongated pedestal and a rotatable swivel connected therewith. The swivel is formed in one piece by molding, extruding or the like.

The present invention is especially directed to an improved type of mounting base which enables one to overcome the difficulty heretofore associated with prior art mounting bases so as to produce a mounting base which is adapted to be free from heat distortion problems and to be rigid and strong in use.

The present invention aims further at providing a simple, effective, and economic mounting base incorporating a swivel of single piece unitary construction which can be manufactured from organic plastic components, especially thermoplastics, and is adapted to display great rigidity and stability in normal combustion with other elements.

Other objects, advantages and purposes will be obvious to those skilled in the art from a reading of the present specification taken together with the drawings.

DETAILED DESCRIPTION

Figure 1:
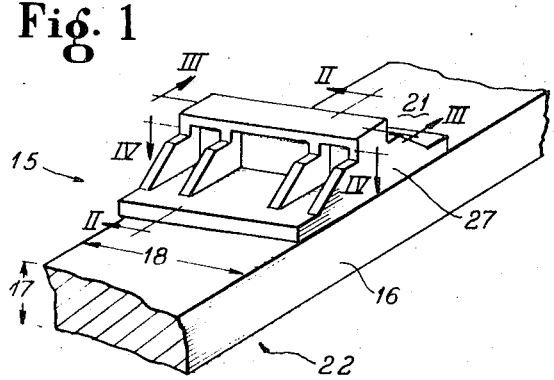
FIG. 1 shows a perspective view of one embodiment of a mounting base incorporating the principles of the present invention.
Figure 2:
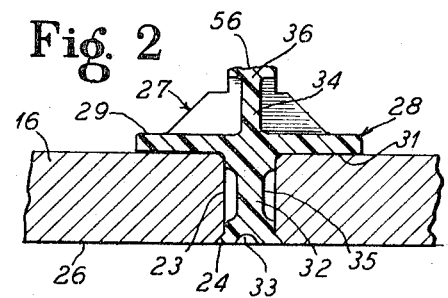
FIG. 2 is a vertical sectional view taken along line II—II of FIG. 1.
Figure 3:
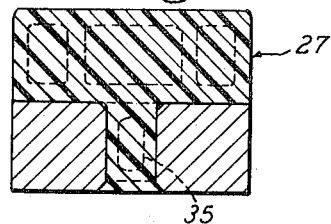
FIG. 3 is a vertical sectional view taken along line III—III of FIG. 1.
Figure 4:
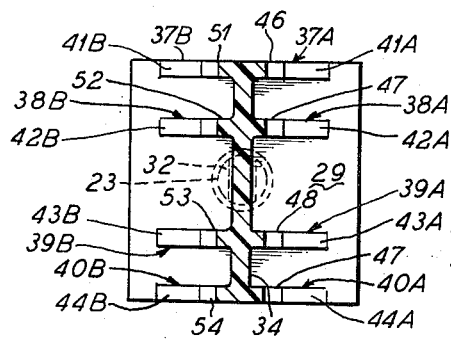
FIG. 4 is a horizontal sectional view taken along the line IV—IV of FIG. 1.

Turning to FIGS. 1 through 4, there is seen a mounting base for a display device, warning device or the like, such mounting base incorporating the principles of the present invention and being designated herein in its entirety by the numeral 15. Mounting base 15 is seen to comprise an elongated pedestal 16 and a swivel 17. The mounting base 15 is shown in FIGS. 1 through 4 in an assembled configuration, but it will be appreciated that the swivel 17 is pivotable on pedestal 16, with a typical disassembled configuration in a display device or the like (not shown) being one wherein the swivel 17 is rotated through 90° from the position generally shown in FIGS. 1 through 4.

Pedestal 16 is elongated and has a width 18 which is substantially greater than the thickness 17 thereof. The top, mid-section 21, at least, of pedestal 16 is adapted to be generally horizontal when pedestal 16 rests on a generally level surface 22.

Pedestal 16 has defined, generally in a central region of mid-section 21, a vertically extending, cross sectionally round hole 23 formed therein. Hole 23 has a beveled edge 24 on the bottom 26 of pedestal 16.

A swivel, which is herein designated in its entirety by the numeral 27, and which is of a single piece of integral construction, is mounted on and in pedestal 16. The swivel 27 has a base portion 28 which has a quadrilateral perimeter and generally flat, spaced, generally parallel top face and bottom face 29 and 31, respectively. A pivot pin 32 projects downwardly from about the center of the bottom face 31 of base portion 28. The pivot pin 32 is adapted to mate with the hole 23. In addition, the pivot pin 32 is adapted to have the end 33 thereof expanded laterally against the beveled edge 24 so as to produce an interlocked configuration between the pivot pin 32 and the pedestal 16 but, at the same time, leave the swivel 27 rotatable relative to the pedestal 16. The bottom face 31 of base portion 28 is in general face-to-face engagement with the mid-section 21 of pedestal 16 when the pivot pin 31 and the pedestal 16 are so interlocked.

A vertically upstanding ridge member 34 transversely extends centrally across the top face 29 of base portion 28. Ridge member 34 has a top edge 36 extending in spaced parallel relationship to the top face 29 of base portion 28.

Swivel 17 has, in the embodiment shown, four vertically upstanding pairs of rib members, designated as pair 37A and 37B, pair 38A and 38B, pair 39A and 39B, and pair 40A and 40B. Each individual rib member 37A, 37B, 38A, 38B, 39A, 39B, 40A and 40B has spaced, generally parallel side walls. Each pair 37A and 37B, 38A and 38B, 39A and 39B, and 40A and 40B transversely extends across top face 29 perpendicularly with respect to ridge member 34. The rib pair members 37A and 37B, 38A and 38B, 39A and 39B, and 40A and 40B, are in laterally spaced, symmetrical relationship to each other, such that such individual members, respectively, 37A and 37B, 38A and 38B, 39A and 39B, 40A and 40B comprising each such pair abut in alignment against opposite respective opposed faces of the ridge member 34. Each pair of ridge members 37A and 37B, 38A and 38B, 39A and 39B, 40A and 40B have generally tapered outside edges 41A and 41B, 42A and 42B, 43A and 43B, 44A and 44B which preferably upwardly decline from the top face 29 to side portions 46, 47, 48 and 49 on one side of ridge member 34 and to side portions 51, 52, 53 and 54 on the opposite side of ridge member 34, in spaced, opposed relationship to the top edge 36 of ridge member 34.

A cap plate 56 horizontally extends over the top edge 36 of ridge member 34, and cap plate 56 extends laterally on either side of top edge 56 of ridge member 34 to, on the one side portion 46, 47, 48 and 49, while, on the other top edge 56 side of the ridge member 34, to the side portions 51, 52, 53 and 54. The cap plate 56 has spaced, generally parallel top and bottom faces.

The interrelationship between the pedestal 16 and the swivel 17 is such that the hole 23 has a diameter which is greater than the average thickness of the base portion 28 of swivel 27. Also, such interrelationship is preferably such that the material comprising the pivot pin 32 fills the hole 23 to an extent only of from about 50 to 90 percent by volume. Additionally, the interrelationship is such that the terminal portion or end 33 of pivot pin 32 is in generally face-to-face slidable engagement with the pedestal 16 to an extent such that the swivel 17 resists lateral movement relative to pedestal 16 in response to a lateral force applied to the cap plate 56.

Two constructions for a pivot pin are shown. The pivot pin 32 of swivel 17 has hollow or flattened sides 35 and an indented terminal portion 33. The pivot pin 63 of swivel 60 has a hollow central portion 70 extending upwardly from its lower end 79. Any convenient form may be used, but it is preferred, for reasons of avoiding heat distortion, to have a pivot pin 63 which fills the hole 23 of a pedestal 16 to an extent only of from about 50 to 90 percent by volume, as indicated above for pin 32.

Figure 5:
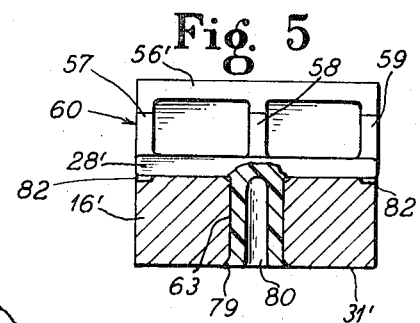
FIG. 5 is a view similar to FIG. 3, but showing an alternative embodiment of the present invention.

In a mounting base 15, the hole 23 preferably has a diameter which is at least about one and one-half times the average thickness of the base portion 28 of swivel 27, and, more preferably, about twice the average thickness of such base portion 28. While the mounting base 15 of FIGS. 1–4 has four pairs of rib members, as above described, it will be appreciated that a mounting base of the invention characteristically has at least three such pairs of rib members. For an exemplary embodiment, see FIG. 5 where swivel 60 is shown. Swivel 60 incorporates three vertically upstanding pairs of rib members one pair being designated as 57, another pair being designated as 58 and the third pair as 59. Except for its pin 67, the other elements of the swivel 60 are similar to those described in reference to the swivel 17 and are similarly numbered as in swivel 17 but with addition of prime marks thereto. While a swivel in accordance with the teachings of the present invention may have any convenient number of rib members beyond three pair, as herein indicated, as a practical matter, it is generally preferred not to have in a swivel more than five pairs of rib members owing to convenience and practicality of fabrication.

Figure 6:
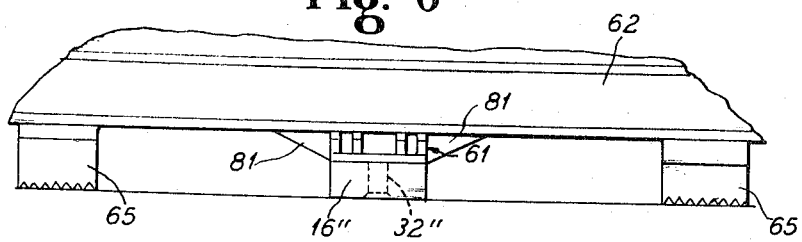
FIG. 6 is a view in side elevation of an embodiment of the type of FIGS. 1–4 of the present invention wherein the cap plate of the swivel forms an integral part of a base member in a device supported by such embodiment, some parts thereof broken away.

In a swivel as taught herein, the cap plate may be separate (see cap plate 56 of swivel 17), which event the top face of such is secured by an adhesive, rivets, or the like to the bottom, preferably center region of a device to be supported thereby. However, in a preferred swivel, the cap plate forms an integral part of a base member, being conveniently integrally formed therewith in a single molding operation, or the like. Such an arrangement is shown in FIG. 6 where the swivel 61 is similar to swivel 17. Here, elements similar to those of swivel 17 are similarly numbered as in swivel 17, but with the addition of double prime marks thereto, except for the cap plate, which in swivel 61 is integral with the bottom such of a base leg member herein designated in its entirety by the numeral 62. Observe that, for added rigidity, base 62 has, adjacent its respective opposite ends, a pair of legs 65 which are integrally formed with base member 62. When swivel 61 is rotated about its pivot pin 32" in a counterclockwise direction, each such leg 65 is brought into face-to-face engagement with a different opposed side of pedestal 16" to make the disassembled assembly compact. Preferably in a swivel 61, a pair of ribs 81 is provided which extend between the ends of the ridge member and the overlying adjacent surface of the base 62; such pair of rib members gives added rigidity to the function of a cap plate in a swivel 61.

Preferably in a mounting base of this invention, the width 64 of the base portion 28 of a swivel such as 17 measured along ridge member 34 is about equal to the width 18 of the pedestal 16 across mid-section 21. Those skilled in the art will appreciate that a pedestal 16 may have any convenient elongated configuration or construction, but it is preferred to make pedestal 16 of metal especially because of the weight and stability of the resulting assembly.

It will be appreciated that the middle rib pairs, such as, for example, rib members 58 of swivel 60, are particularly useful in restricting forces laterally applied against, for example, cap plate 56', which the end rib pairs, such as, for example, rib members 57 of swivel 60 are useful, among other purposes, for stabilizing cap plate 56' against rocking motions perhaps diagonally exertered thereagainst, and for stabilizing the base portion 28' in a flat configuration against a pedestal such as 16. Observe that the terminal portion 79 of pivot pin 63 coacts with the perimeter portions of bottom face 31' to stabilize a swivel 60 relative to pedestal 16'.

A swivel as taught herein is particularly useful where a device is to be supported in a spaced relationship to an underlying supporting surface. For example, referring to FIG. 7, there is seen a warning device 66 of the triangular type usable to alert on-coming traffic to the presence of a disabled vehicle and thereby prevent rear end collisions. Such a warning device 66 is specified in the United States Government Motor Vehicle Safety Standard No. 125 (effective Jan. 1, 1974) which specifies that the lower edge of the base 67 of the triangular assembly 68 shall be not less than 1 inch above the ground. This standard additionally specifies that such triangular assembly 68 shall be in a plane not more than 10° from the vertical. Further specified is the fact that such a triangular assembly 68 shall not tilt to a position that is more than 10° from the vertical in a horizontal wind of 40 miles per hour in any direction applied for 3 minutes, and that, under such conditions, its triangular position shall not turn through a horizontal angle of more than 10° in either direction from the initial position.

Such a device 66 to pass this Standard 125 must be capable of being submitted to a conditioning sequence before being returned to an ambient temperature condition (68° F) which includes exposure to −40° F temperatures for 16 hours in a circulating air chamber, exposure to 150° F for 16 hours in a circulating air oven using ambient air, exposure to 100° F and 90 percent relative humidity for 16 hours, exposure to salt spray (fog) in accordance with ASTM test procedure No. B-117 (August, 1964), except that the tests shall be for 4 hours rather than 40 hours, and, finally, immersion for two hours in water in a temperature of 100° F. During such conditioning sequence and following same, a warning device 66 must be of such a construction that no part thereof shall become warped or separated from the rest of the device 66. The combination of a triangular assembly 68 with a mounting base of this invention, such as pedestal 16 and swivel 61 can be made to easily meet such criteria as these just indicated above.

Figure 7:
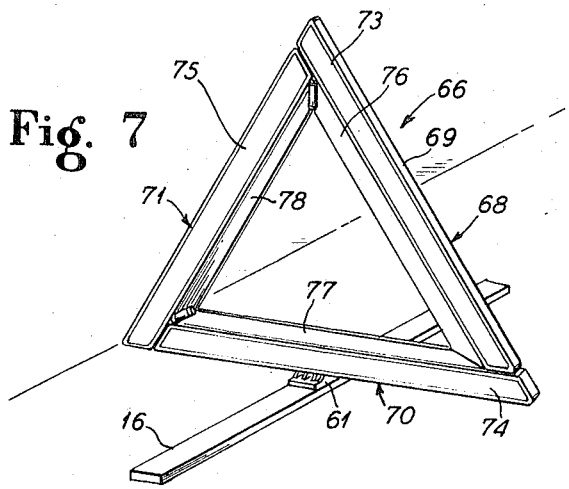
FIG. 7 shows a perspective, diagrammatic view of a warning device incorporating the construction and embodiment illustrated in FIG. 6.

Referring to FIG. 7, device 66 is seen to comprise a triangular assembly 68, a pedestal 16, and a swivel 61. Device 66 is shown in an assembled configuration wherein the triangular assembly 68 is mounted on pedestal 16, but is pivoted on swivel 61 to extend normally to pedestal 17.

Triangular assembly 68 is seen to incorporate three leg members, herein each designated in its entirety by the respective numerals 69, 70 and 71. The leg members 69, 70 and 71 are adpated to coact together in abutting end-to-end relationship to form triangular assembly 68. Each leg member 69, 70 and 71 has an outside perimeter portion 73, 74 and 75, respectively, which is thickened relative to the adjacent inside perimeter portion 76, 77 and 78, respectively, of each leg 69, 70 and 71. This constructional arrangement for legs 69, 70 and 71 of the triangular assembly 68 in a warning device 66 is in conformance to that established by governmental agencies; see, for example, the above referenced Standard No. 125.

Preferred materials of construction for a swivel used in this invention are thermoplastics such as polyvinyl chloride rubber, reinforced styrene polymers, and the like, as those skilled in this art will appreciate.

Those skilled in the art will appreciate that the cap plate in a swivel may, and characteristically does, have a width which is narrower than the length thereof (measured along the ridge member). The width, however, is usually at least four times the width of the ridge member and the cap plate on portions thereof which extend beyond the edges of the ridge member and are supported by and are integral with the upper edges of the respective rib members.

A swivel, such as swivel 60, optionally can be equipped with detent means 82 which serve to index a swivel 60 relative to a base pedestal 16' between positions of assembly and disassembly.

Other and further modifications and embodiments wil be obvious to those skilled in this art from a reading of the present specification, drawings and claims, and no undue limitations are to be associated therewith.

We claim:
1. A mounting base for a display device or the like comprising:
   A. an elongated pedestal whose width is generally substantially greater than the thickness thereof and which has a generally flattened, top, mid-section adapted to be generally horizontal in extent when the bottom of said pedestal rests on a generally level surface, said pedestal further having defined generally in a central region of said mid-section thereof a vertically extending, cross-sectionally round hole having a beveled edge region adjacent the bottom of said pedestal,
   B. a swivel of single-piece, integral construction comprising:
      1. a base portion having a generally quadrilateral perimeter and generally flat, spaced, generally parallel top and bottom faces,
      2. a pivot pin projecting downwardly from about the center of said bottom face, said pivot pin being adapted to mate with said hole and being further adapted to have the terminal portion thereof expanded against said beveled edge region in an interlocked, circumferentially slidable configuration with said pedestal with said bottom face being in general face-to-face slidable engagement with said top mid-section,
      3. a vertically upstanding ridge member transversely extending across the mid-region of said top face and having an upper edge extending in spaced, generally parallel relationship to said top face,
      4. at least three vertically upstanding pairs of rib members, each one with spaced, generally parallel side walls, each said pair transversely extending across said top face perpendicularly to said ridge member in laterally spaced, symmetrical relationship to other pairs such that the members of each such pair abut in alignment against opposite respective opposed faces of said ridge member, said rib members having a height generally equal to said upper edge,
      5. a cap plate means horizontally extending over said top edge and over at least a portion of said rib members and having spaced, generally parallel top and bottom faces, and
   C. the interrelationship between said pedestal and said swivel being such that
      1. said hole has a diameter which is greater than the average thickness of said base portion,
      2. said terminal portion of said pivot pin is generally in face-to-face, slidable engagement with said pedestal to an extent such that said swivel resists lateral movement relative to said pedestal in reaponse to lateral force applied to said cap plate means.

2. The base of claim 1 wherein said hole has a diameter which is at least about 1.5 times the average thickness of said base portion.

3. The base of claim 1 wherein said hole has a diameter which is at least about twice the average thickness of said base portion.

4. The base of claim 1 wherein said swivel has four pairs of said rib members.

5. The base of claim 1, wherein said cap plate means forms an integral portion of the bottom center region of a device being interconnected with said base.

6. The base of claim 1 wherein said base portion has a width measured along said ridge member about equal to the width of said pedestal across said mid-section thereof.

7. The base of claim 1 wherein said interrelationship is such that the material comprising said pivot pin fills said hole to an extent only of from about 50 to 90 percent by volume.

8. The base of claim 1 wherein each such pair of said rib members has generally tapered outside edges upwardly declining from said top face to side positions in spaced, opposed, paired relationship to said top edge of said ridge member.

9. The base of claim 5 wherein said bottom has a pair of legs depending therefrom and at each respective opposite end portion of said bottom, such pair of legs being adapted to add stability and rigidity thereto.

10. A swivel of single-piece, integral construction comprising:
   A. a base portion having a generally quadrilateral perimeter and generally flat, spaced, generally parallel top and bottom faces,
   B. a pivot pin projecting downwardly from about the center of said bottom face, said pivot pin being adapted to mate with said hole and being further adapted to have the terminal portion thereof expanded against said beveled edge region in an interlocked, circumferentially slidable configuration with said pedestal with said bottom face being in general face-to-face slidable engagement with said top mid-section,
   C. a vertically upstanding ridge member transversely extending across the mid-region of said top face and having an upper edge extending in spaced, generally parallel relationship to said top face,
   D. At least three vertically upstanding pairs of rib members, each one with spaced, generally parallel side walls, each said pair transversely extending across said top face perpendicularly to said ridge member in laterally spaced, symmetrical relationship to other pairs such that the members of each such pair abut in alignment against opposite respective opposed faces of said ridge member, said rib members having a height generally equal to said upper edge, and
   E. a cap plate means horizontally extending over said top edge and over at least a portion of said rib members and having spaced, generally parallel top and bottom faces.

11. A swivel according to claim 10 wherein each such pair of said rib members has generally tapered outside edges upwardly declining from said top face to side positions in spaced, opposed, paired relationship to said top edge of said ridge member.

* * * * *